United States Patent
Hisano et al.

(10) Patent No.: US 11,030,473 B2
(45) Date of Patent: Jun. 8, 2021

(54) INFORMATION PROCESSING APPARATUS AND NON-TRANSITORY COMPUTER READABLE MEDIUM STORING INFORMATION PROCESSING PROGRAM

(71) Applicant: FUJI XEROX CO., LTD., Tokyo (JP)

(72) Inventors: Toru Hisano, Kanagawa (JP); Kazunori Horikiri, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 247 days.

(21) Appl. No.: 16/153,840

(22) Filed: Oct. 8, 2018

(65) Prior Publication Data

US 2019/0114503 A1 Apr. 18, 2019

(30) Foreign Application Priority Data

Oct. 16, 2017 (JP) .............................. JP2017-200107

(51) Int. Cl.
| | |
|---|---|
| *G06K 9/34* | (2006.01) |
| *G06F 3/16* | (2006.01) |
| *G06F 16/683* | (2019.01) |
| *G06K 9/00* | (2006.01) |

(52) U.S. Cl.
CPC ............ *G06K 9/344* (2013.01); *G06F 3/167* (2013.01); *G06F 16/683* (2019.01); *G06K 9/00402* (2013.01); *G06K 2209/01* (2013.01)

(58) Field of Classification Search
CPC .............. G06K 9/344; G06K 9/00402; G06K 2209/01; G06K 9/2081; G06F 16/683; G06F 3/167; G06F 3/03545; G06F 3/04883; G06F 21/60; G10L 15/00; H06F 3/0488; G06Q 10/063112
USPC ....................................................... 382/176
See application file for complete search history.

(56) References Cited

U.S. PATENT DOCUMENTS

| | | | | |
|---|---|---|---|---|
| 7,213,766 | B2 * | 5/2007 | Ryan | G06F 13/385 |
| | | | | 235/472.02 |
| 9,176,605 | B2 * | 11/2015 | Yoshida | G06F 3/0317 |
| 2002/0067852 | A1 * | 6/2002 | Nathan | G06K 9/00852 |
| | | | | 382/186 |
| 2004/0153319 | A1 * | 8/2004 | Yacoub | G10L 15/32 |
| | | | | 704/240 |
| 2005/0134926 | A1 * | 6/2005 | Takezaki | G06K 15/00 |
| | | | | 358/3.28 |
| 2005/0134927 | A1 * | 6/2005 | Nomura | G06F 3/03545 |
| | | | | 358/3.28 |
| 2006/0248028 | A1 * | 11/2006 | Tedesco | G06K 9/00624 |
| | | | | 706/14 |

(Continued)

FOREIGN PATENT DOCUMENTS

| | | | |
|---|---|---|---|
| JP | 08096071 | A * | 4/1996 |
| JP | 2008123265 | | 5/2008 |

(Continued)

*Primary Examiner* — Mahendra R Patel
(74) *Attorney, Agent, or Firm* — JCIPRNET

(57) ABSTRACT

An information processing apparatus includes a character recognition unit that recognizes a handwritten character in creating a tag which is attachable to a mount, a sound recognition unit that recognizes a sound, and a correction unit that corrects a recognition result obtained by the character recognition unit by using a recognition result of the sound recognition unit.

8 Claims, 14 Drawing Sheets

(56) References Cited

U.S. PATENT DOCUMENTS

| | | | | |
|---|---|---|---|---|
| 2008/0155540 | A1* | 6/2008 | Mock | G06Q 10/063112 718/100 |
| 2013/0179151 | A1* | 7/2013 | Iverson | G10L 15/19 704/9 |
| 2014/0362002 | A1* | 12/2014 | Nakasu | G06F 3/0416 345/173 |
| 2015/0019227 | A1* | 1/2015 | Anandarajah | G06F 3/0481 704/257 |
| 2015/0213393 | A1* | 7/2015 | O'Neill | G06Q 10/063112 705/7.14 |
| 2015/0278747 | A1* | 10/2015 | Karanam | G06Q 50/01 705/7.14 |
| 2016/0012020 | A1* | 1/2016 | George | G10L 15/1815 704/9 |
| 2016/0342911 | A1* | 11/2016 | Kannan | G06Q 10/0631 |
| 2017/0324572 | A1* | 11/2017 | Biggs | H04L 29/08 |

FOREIGN PATENT DOCUMENTS

| | | | |
|---|---|---|---|
| KR | 950005533 B1 | * | 5/1995 |
| KR | 20100010396 A | * | 2/2010 |

* cited by examiner

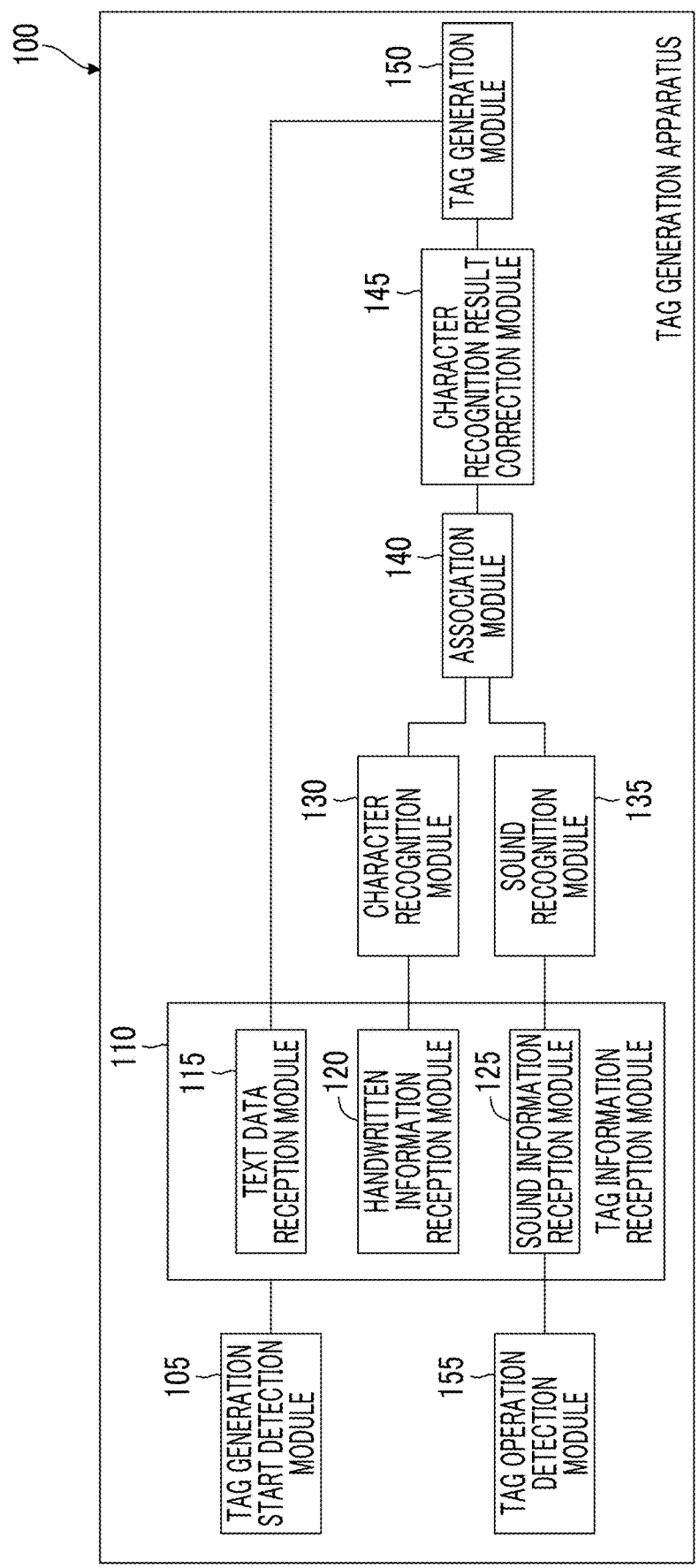

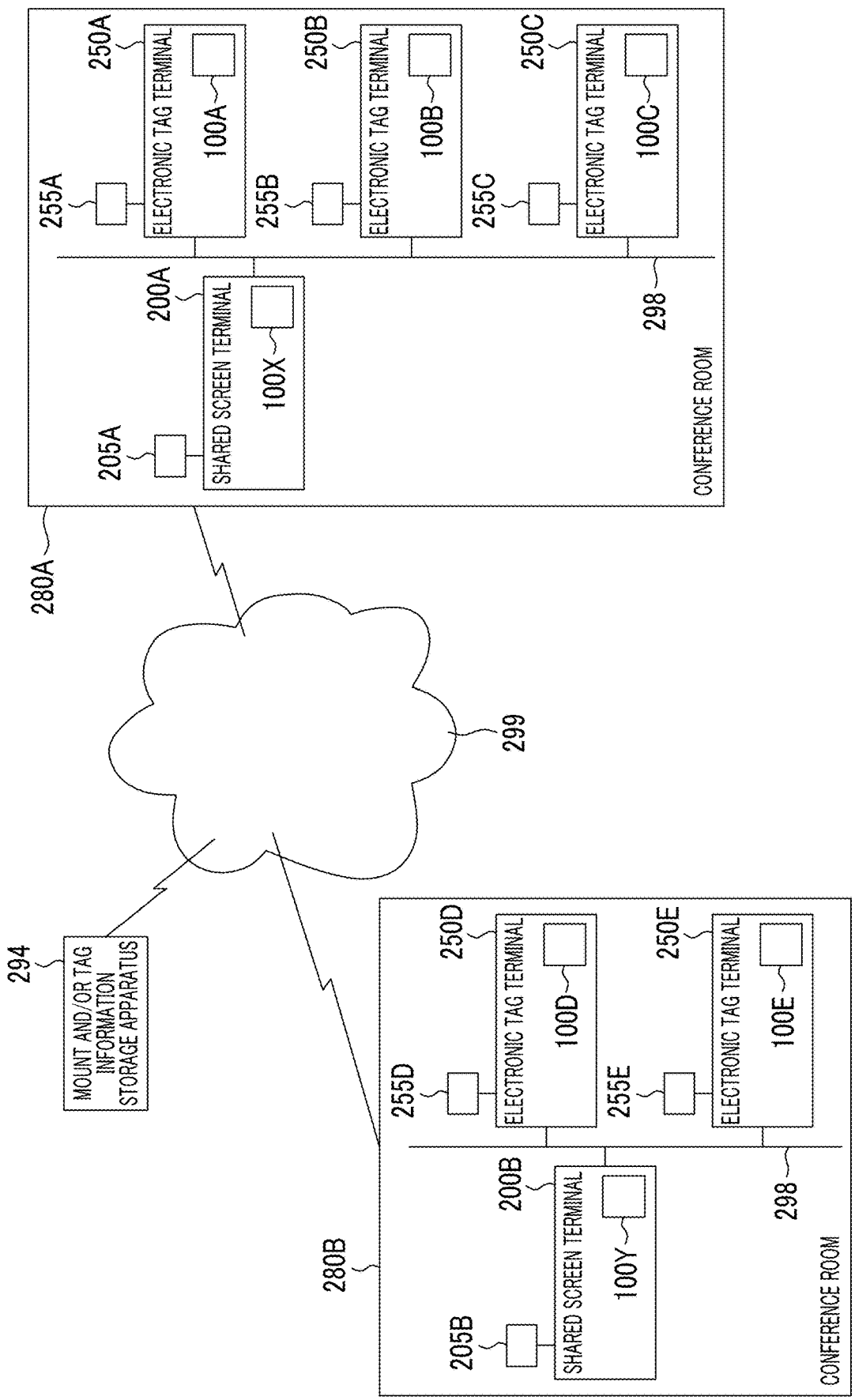

FIG. 4

| 405 | 410 | 415 | 420 | 425 | 430 | 435 | 440 | 445 | 400 |
|---|---|---|---|---|---|---|---|---|---|
| TAG ID | STARTING DATE AND TIME | TERMINATION DATE AND TIME | HANDWRITTEN ORIGINAL DATA | USER ID | RECOGNITION RESULT 1 | DEGREE OF CERTAINTY 1 | RECOGNITION RESULT 2 | DEGREE OF CERTAINTY 2 | ... |

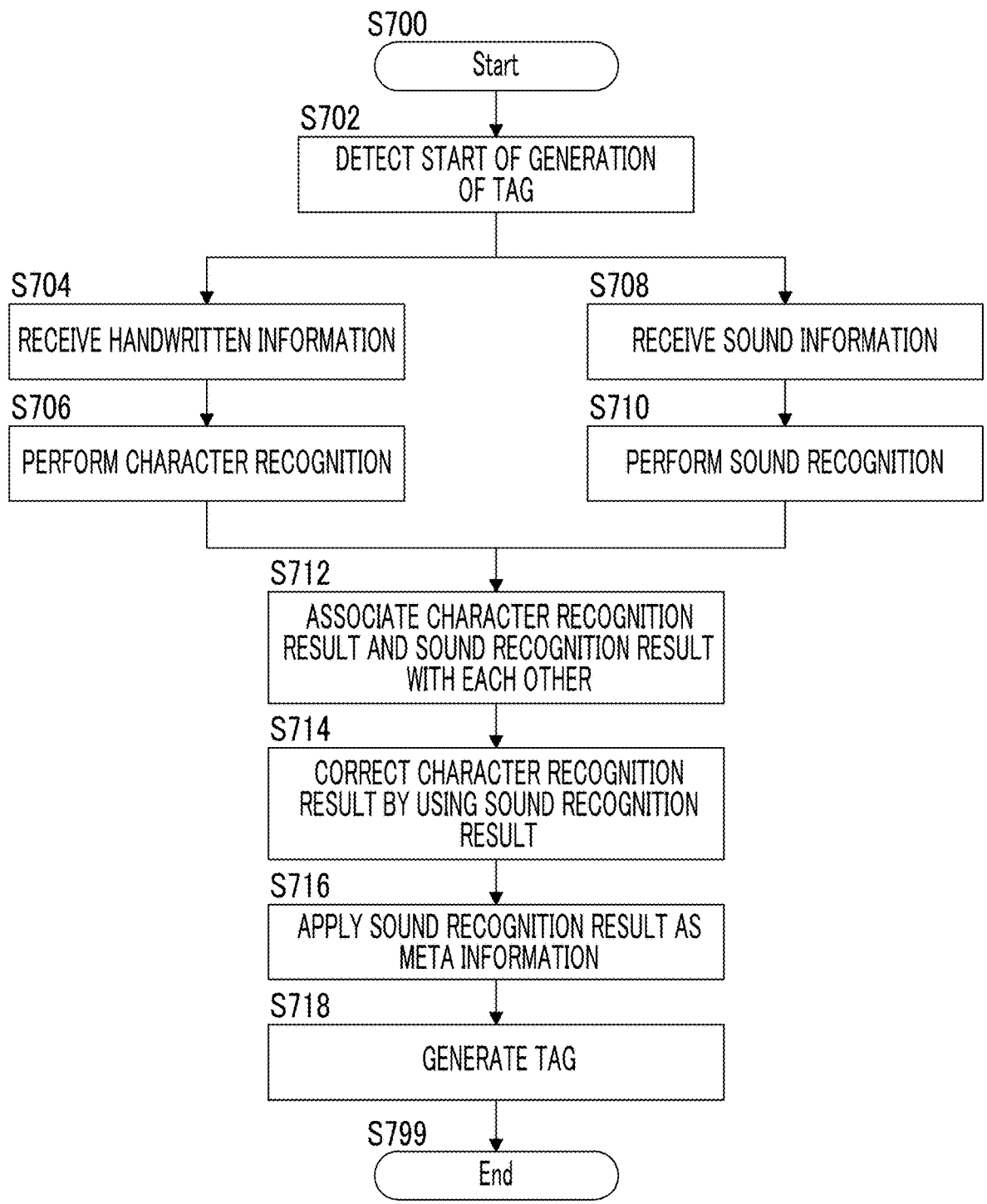

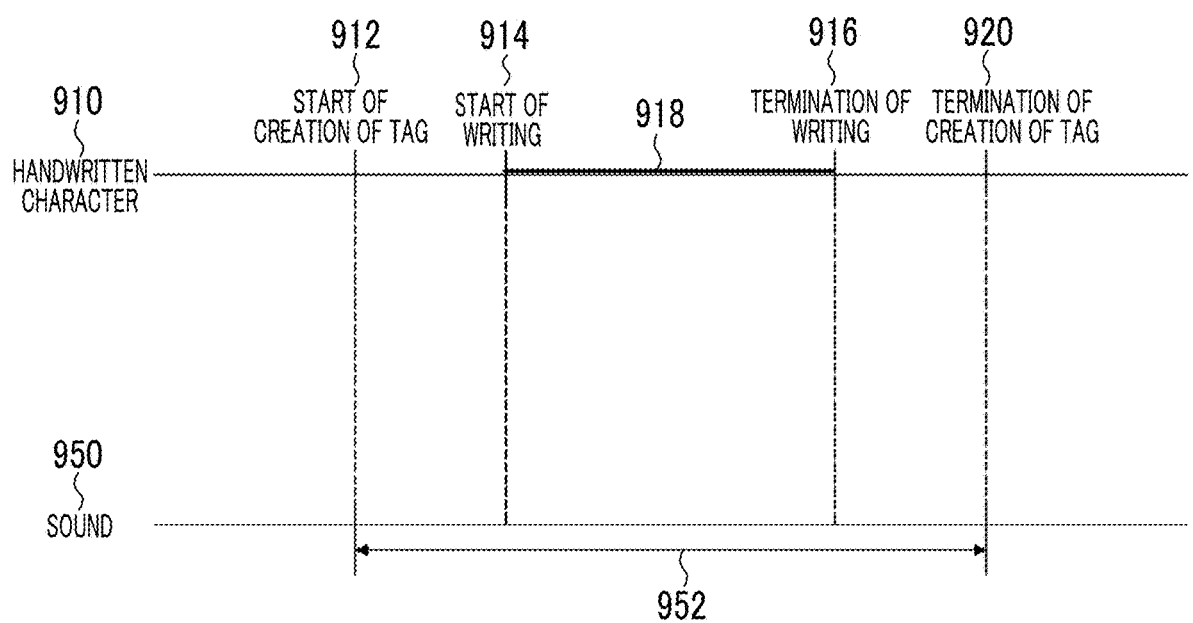

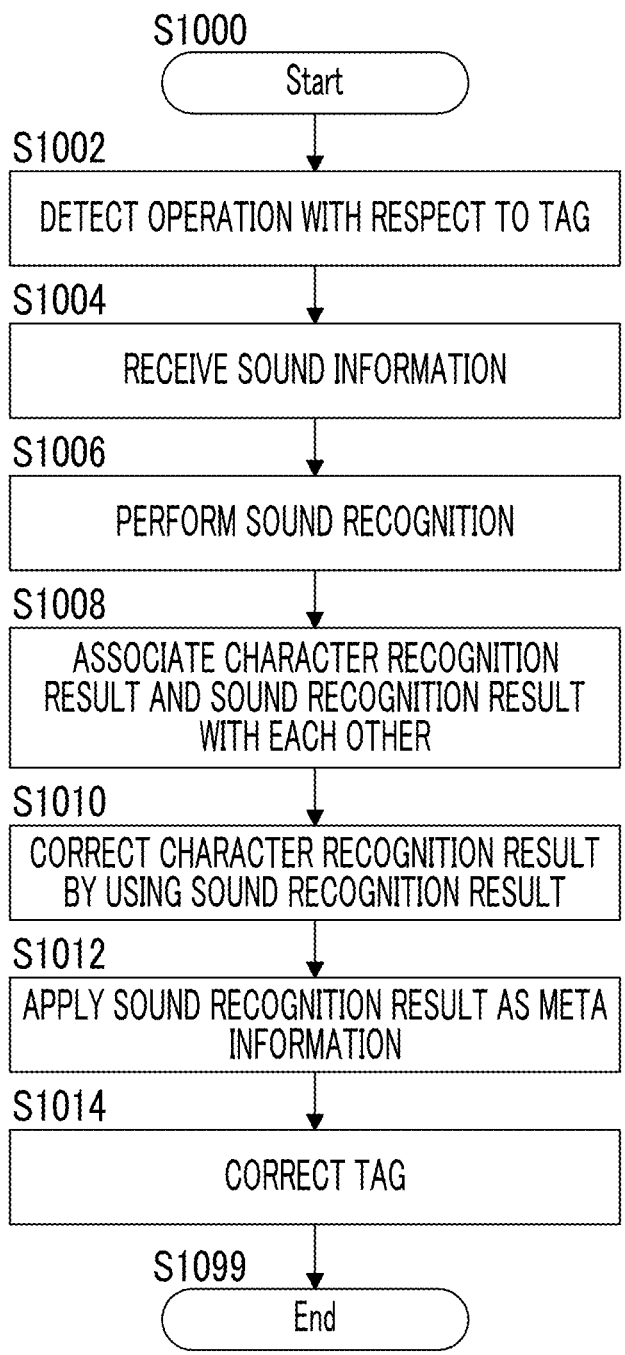

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2017-200107 filed Oct. 16, 2017.

BACKGROUND

Technical Field

The present invention relates to an information processing apparatus and a non-transitory computer readable medium storing an information processing program.

SUMMARY

According to an aspect of the invention, there is provided an information processing apparatus including a character recognition unit that recognizes a handwritten character in creating a tag which is attachable to a mount, a sound recognition unit that recognizes a sound, and a correction unit that corrects a recognition result obtained by the character recognition unit by using a recognition result of the sound recognition unit.

BRIEF DESCRIPTION OF THE DRAWINGS

Exemplary embodiment(s) of the present invention will be described in detail based on the following figures, wherein:

FIG. 1 is a conceptual module configuration diagram illustrating a configuration example according to this exemplary embodiment;

FIG. 2 is a diagram illustrating a configuration example of a tag system using this exemplary embodiment;

FIG. 4 is a diagram illustrating an example of a data structure of a handwritten recognition result table;

FIG. 7 is a flowchart illustrating a processing example according to this exemplary embodiment;

FIG. 9 is a diagram illustrating a processing example according to this exemplary embodiment;

FIG. 10 is a flowchart illustrating a processing example according to this exemplary embodiment;

DETAILED DESCRIPTION

Figure 3A:
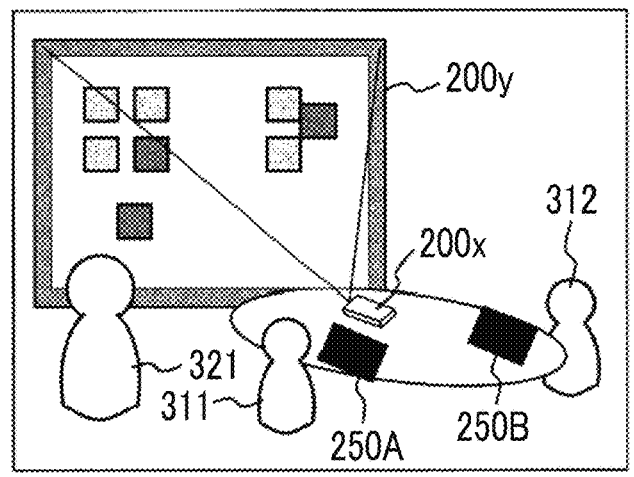
FIGS. 3A to 3C are diagrams respectively illustrating usage examples of an electronic tag terminal and a shared screen terminal in a conference room or the like used in this exemplary embodiment.

Hereinafter, an example of an exemplary embodiment in realizing the invention will be described with reference to the accompanying drawings.

FIG. 1 is a conceptual module configuration diagram illustrating a configuration example of this exemplary embodiment.

Meanwhile, the term "module" refers to components such as software (computer programs) and hardware which are typically capable of being logically separated. Consequently, the term "module" in this exemplary embodiment not only refers to modules in a computer program, but also to modules in a hardware configuration. Thus, this exemplary embodiment also serves as a description of a computer program (a program that causes a computer to execute respective operations, a program that causes a computer to function as respective units, or a program that causes a computer to realize respective functions), a system, and a method for inducing functionality as such modules. Meanwhile, although terms like "store" and "record" and their equivalents may be used in the description for the sake of convenience, these terms mean that a storage apparatus is made to store information or that control is applied to cause a storage apparatus to store information in the case where the exemplary embodiment is a computer program. In addition, while modules may be made to correspond with function on a one-to-one basis, some implementations may be configured such that one program constitutes one module, such that one program constitutes multiple modules, or conversely, such that multiple programs constitute one module. Moreover, plural modules may be executed by one computer, but one module may also be executed by plural computers in a distributed or parallel computing environment. Meanwhile, a single module may also contain other modules. In addition, the term "connection" may be used hereinafter to denote logical connections (such as the transmission and reception of data, instructions, a referential relationship between pieces of data, and log-in) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of plural "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted. Additionally, the case of the listing of things such as "A, B, C" is illustrative listing unless otherwise indicated, and includes a case where only one of them is selected (for example, only A).

In addition, the terms "system" and "apparatus" not only encompass configurations in which plural computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time plural processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be omitted in some cases. Meanwhile, the storage apparatus herein may include hard disks, random access memory (RAM), an external storage medium, storage apparatus accessed via a communication link, and registers, and the like inside a central processing unit (CPU).

A tag generation apparatus 100 which is this exemplary embodiment performs processing regarding a mount and a tag (also referred to as an electronic tag, an electronic card, and the like) which are used at the assembly, and includes a tag generation start detection module 105, a tag information reception module 110, a character recognition module 130, a sound recognition module 135, an association module 140, a character recognition result correction module 145, a tag generation module 150, and a tag operation detection module 155, as illustrated in the example of FIG. 1. Meanwhile, the meeting may be a meeting in which plural persons gather and talk with each other, and examples of the assembly include a conference, a workshop, an idea extraction meeting, an examination meeting, a consultation, a discussion, a gathering, a meeting, and the like. This exemplary embodiment relates to an electronic tag system (also referred to as an electronic white board and the like) which uses an electronic tag and a mount.

As illustrated in the example of FIG. 2, a shared screen terminal 200 and an electronic tag terminal 250 which include the tag generation apparatus 100 are specifically used at an assembly which is performed by a facilitator (generally, one person) and plural participants by using a tag. The participant creates a tag in which an idea and the like are written, by using the electronic tag terminal 250 as a participant terminal. In addition, the facilitator also creates a tag in which an idea and the like are written, by using the shared screen terminal 200.

In general, as illustrated in the example of FIG. 3, there are plural electronic tag terminals 250 including an electronic tag terminal 250A, an electronic tag terminal 250B, and the like (hereinafter, representatively referred to as the electronic tag terminal 250) which are owned by the respective participants. The shared screen terminal 200 receives a tag from the electronic tag terminal 250 and attaches the tag onto a mount (or a background). The facilitator determines or changes the position of the tag on the mount or arranges the tags (associates a first tag and a second tag with each other; also referred to as grouping or the like) by using a shared screen which is a display apparatus of the shared screen terminal 200, and performs the creation of tag information, and the like by itself to progress the assembly. Meanwhile, in this exemplary embodiment, the participants include a facilitator.

The tag generation start detection module 105 is connected to the tag information reception module 110. The tag generation start detection module 105 detects that a tag has been generated, on the shared screen terminal 200 or the electronic tag terminal 250. For example, it may be detected that a button for generating a tag has been pressed down.

The tag information reception module 110 includes a text data reception module 115, a handwritten information reception module 120, and a sound information reception module 125, and is connected to the tag generation start detection module 105. The tag information reception module 110 receives information (data) to be written in a tag. Here, examples of the information to be written in a tag include text data and handwritten data. Sound data is received as auxiliary data for recognizing the handwritten data or metadata of the tag.

The text data reception module 115 is connected to the tag generation module 150. The text data reception module 115 receives text data serving as contents of a tag. For example, the text data reception module receives text data which is fed by the participant by using a keyboard (a virtual keyboard displayed on a display is included), a mouse, or the like.

The handwritten information reception module 120 is connected to the character recognition module 130. The handwritten information reception module 120 receives handwritten data serving as contents of a tag. For example, the handwritten information reception module receives handwritten data written on a touch panel by using a finger, a pen, or the like. The handwritten data as mentioned here is data indicating the motion of a finger, a pen, or the like, and is stroke data. The stroke data as mentioned herein includes positional coordinates of a starting point of a stroke using a finger, a pen, or the like, positional coordinates of a termination point, and information regarding a written date and time (may be year, month, day, hour, minute, second, a time unit smaller than second, or a combination thereof). The stroke data is a target for character recognition by the character recognition module 130, and is text data or figure data written in a tag.

Meanwhile, the handwritten information reception module 120 starts to receive the handwritten data when the tag generation start detection module 105 detects that the generation of a tag is performed.

The sound information reception module 125 is connected to a sound recognition module 135 and a tag operation detection module 155. The sound information reception module 125 receives sound data. For example, the sound data may be digital data of a sound received by a microphone included in a pen for handwriting, a microphone within a wearable computer worn on a user's clothes, or the like, in addition to a sound received by a microphone 255 included in the electronic tag terminal 250 and a microphone 205 included in the shared screen terminal 200. The sound data as mentioned herein may include date and time information having the sound received. The sound data serves a target for sound recognition by the sound recognition module 135.

Meanwhile, the sound information reception module 125 starts to receive the sound data when the tag generation start detection module 105 detects that the generation of a tag is performed or when the tag operation detection module 155 detects that an operation with respect to a tag has been performed.

The character recognition module 130 is connected to the handwritten information reception module 120 of the tag information reception module 110, and the association module 140. The character recognition module 130 recognizes a handwritten character in creating a tag which is attachable to a mount. In addition, the degree of certainty of a recognition result thereof may be calculated. The degree of certainty as mentioned herein refers to probability that the recognition result is the correct answer, and the reliability of the recognition result increases as the value of the degree of certainty becomes larger. The character recognition module 130 may use, for example, a known character recognition technique. Specifically, online handwritten character recognition may be used.

The character recognition module 130 generates, for example, a handwritten recognition result table 400 as result of character recognition processing. FIG. 4 is a diagram illustrating an example of a data structure of the handwritten recognition result table 400. The handwritten recognition result table 400 includes a tag ID column 405, a starting date and time column 410, a termination date and time column 415, a handwritten original data column 420, a user ID column 425, a recognition result 1 column 430, a certainty degree 1 column 435, a recognition result 2 column 440, and a certainty degree 2 column 445. The tag ID column 405 stores information (tag Identification (ID)) for uniquely identifying a tag in this exemplary embodiment. The tag as mentioned herein is a tag on which handwriting has been performed. The starting date and time column 410 stores a date and time when handwriting is started (may be year, month, day, hour, minute, second, a time unit smaller than second, or a combination thereof). The termination date and time column 415 stores a date and time when handwriting is terminated. The handwritten original data column 420 stores handwritten original data (the above-described stroke data). The user ID column 425 stores information (user ID) for uniquely identifying a user performing handwriting in this exemplary embodiment. The recognition result 1 column 430 stores a recognition result 1 (a recognition result indicating that the degree of certainty is the first grade) which is obtained by the character recognition module 130. The certainty degree 1 column 435 stores the degree of certainty 1 of the recognition result 1. The recognition result 2 column 440 stores a recognition result 2 (a recognition result indicating that the degree of certainty is the second grade) which is obtained by the character recognition module 130. The certainty degree 2 column 445 stores the degree of certainty 2 of the recognition result 2. In addition, a recognition result and the degree of certainty which indicate that the degree of certainty is equal to or lower than the third grade may be stored.

The sound recognition module 135 is connected to the sound information reception module 125 of the tag information reception module 110, and the association module 140. The sound recognition module 135 recognizes a sound. The sound recognition module 135 may use, for example, a known sound recognition technique.

In addition, the sound recognition module 135 may recognize a sound related to a tag.

For example, the sound recognition module 135 may set a sound generated during the handwriting of a target character of the character recognition module 130 with respect to a tag, as an object to be recognized.

In addition, for example, the sound recognition module 135 may set a sound of an operator creating a tag, as an object to be recognized. The sound to be recognized is a sound which is received by a microphone included in the electronic tag terminal 250 that creates a tag, the vicinity (the above-described wearable computer is included) of the electronic tag terminal 250, a pen for handling the electronic tag terminal 250, or the like. Meanwhile, in a case where a tag is created on a shared screen, a sound of a facilitator is set to be an object to be recognized, and thus the sound to be recognized in that case is set to be a sound which is received by a microphone included in the shared screen, the vicinity of the shared screen, a pen for handling the shared screen, or the like.

In addition, for example, the sound recognition module 135 may set a sound generated during the operation of a tag, as an object to be recognized.

The sound recognition module 135 may set a sound generated during the operation of a tag by a facilitator or a creator of the tag, as an object to be recognized.

Figure 5:
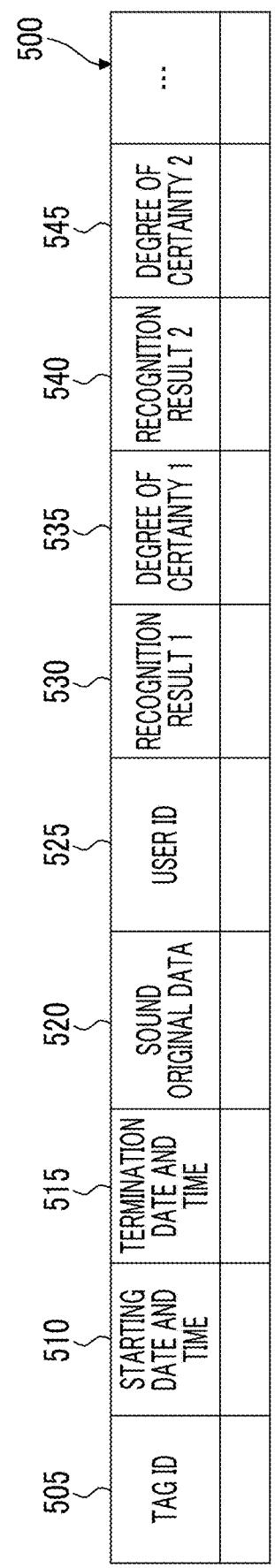
FIG. 5 is a diagram illustrating an example of a data structure of a sound recognition result table.

The sound recognition module 135 generates, for example, a sound recognition result table 500, as results of sound recognition processing. FIG. 5 is a diagram illustrating an example of a data structure of the sound recognition result table 500. The sound recognition result table 500 includes a tag ID column 505, a starting date and time column 510, a termination date and time column 515, a sound original data column 520, a user ID column 525, a recognition result 1 column 530, a certainty degree 1 column 535, a recognition result 2 column 540, and a certainty degree 2 column 545. The tag ID column 505 stores a tag ID. A tag as mentioned herein refers to a tag for generating a sound generated during the creation or explanation of the tag. The starting date and time column 510 stores a date and time when the recording of a sound is started. Meanwhile, the recording of the sound may be started by the generation of the sound. The termination date and time column 515 stores a date and time when the recording of a sound is terminated. The sound original data column 520 stores original data of a sound. The user ID column 525 stores a user ID of a user who utters a sound. The recognition result 1 column 530 stores a recognition result 1 obtained by the sound recognition module 135. The certainty degree 1 column 535 stores the degree of certainty 1 of the recognition result 1. The recognition result 2 column 540 stores a recognition result 2 obtained by the sound recognition module 135. The certainty degree 2 column 545 stores the degree of certainty 2 of the recognition result 2.

The association module 140 is connected to the character recognition module 130, the sound recognition module 135, and the character recognition result correction module 145. The association module 140 associates a character recognition result obtained by the character recognition module 130 and a sound recognition result obtained by the sound recognition module 135 with each other. For example, the character recognition result and the sound recognition result may be associated with each other in accordance with a date and time when handwritten data is written and a date and time when a sound is received. In a case where an operation with respect to a tag is performed, a sound received by the sound information reception module 125 and a character recognition result in the tag may be associated with each other.

The character recognition result correction module 145 is connected to the association module 140 and the tag generation module 150. The character recognition result correction module 145 corrects recognition results obtained by the character recognition module 130 by using the recognition results of the sound recognition module 135. A correction method will be described later by using examples of FIGS. 13 and 14.

The tag generation module 150 is connected to the text data reception module 115 of the tag information reception module 110, and the character recognition result correction module 145. The tag generation module 150 generates a tag having the text data, received by the text data reception module 115, as contents, or a tag having the recognition results, corrected by the character recognition result correction module 145, as contents.

In addition, the tag generation module 150 may add recognition results of the sound recognition module 135, as meta information of a tag.

In addition, the tag generation module 150 may add a figure handwritten on a tag, as meta information. In this case, a handwritten portion which is irrecognizable by the character recognition module 130 may be set to be a figure.

Figure 6:
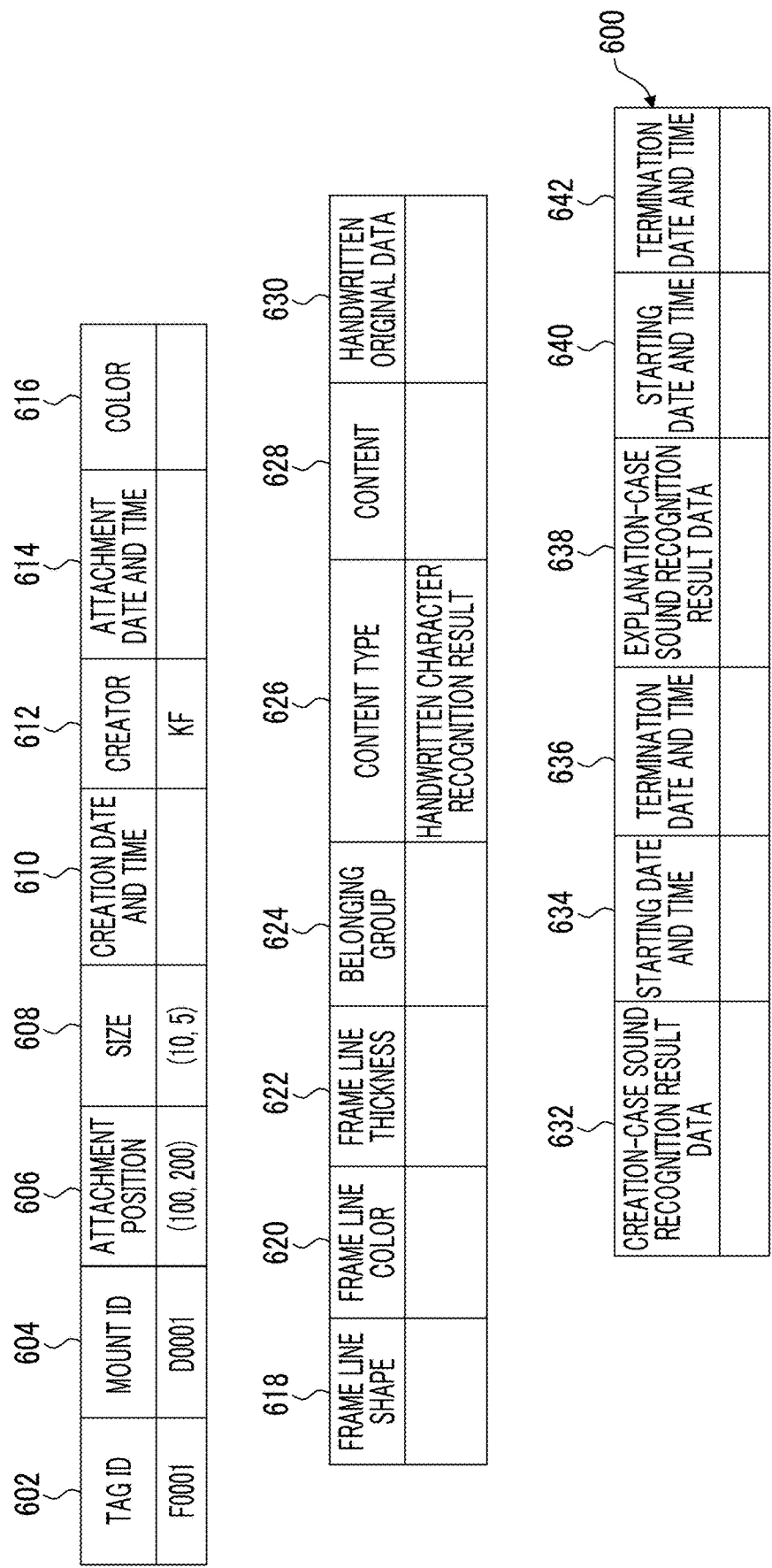
FIG. 6 is a diagram illustrating an example of a data structure of a tag information table.

The tag generation module 150 generates, for example, a tag information table 600, as tag generation results. FIG. 6 is a diagram illustrating an example of a data structure of the tag information table 600. The tag information table 600 includes a tag ID column 602, a mount ID column 604, an attachment position column 606, a size column 608, a creation date and time column 610, a creator column 612, an attachment date and time column 614, a color column 616, a frame line shape column 618, a frame line color column 620, a frame line thickness column 622, a belonging group column 624, a content type column 626, a content column 628, a handwritten original data column 630, a creation-case sound recognition result data column 632, a starting date and time column 634, a termination date and time column 636, an explanation-case sound recognition result data column 638, a starting date and time column 640, and a termination date and time column 642. The tag ID column 602 stores a tag ID. The mount ID column 604 stores information (mount ID) for uniquely identifying a mount in this exemplary embodiment. That is, a mount ID indicates a mount to which a tag having the tag ID is attached. The attachment position column 606 stores a position where the tag is attached. That is, the attachment position column stores an attachment position on the mount. For example, the attachment position is coordinates of the mount in an XY coordinate system. The size column 608 stores the size of the tag. For example, in a case where a tag to be displayed has a rectangular shape, the width and height of the tag are stored. The creation date and time column 610 stores a date and time when the tag is created. The creator column 612 stores a creator (user ID) of the tag. Alternatively, the creator column may store information processing apparatus (a device ID of the electronic tag terminal 250 or the shared screen terminal 200) by which the tag is created. The attachment date and time column 614 may store a date and time when the tag is attached to a mount. The color column 616 stores the display color of the tag. The frame line shape column 618 stores the shape (a solid line, a dotted line, a dashed line, a wavy line, a double line, or the like) of a frame line in the display of the tag. The frame line color column 620 stores the color of the frame line in the display of the tag. The frame line thickness column 622 stores the thickness of the frame line in the display of the tag. The belonging group column 624 stores information on a group to which the tag belongs. For example, information indicating whether or not the tag belongs to a group may be stored, or a group ID in a case where the tag belongs to a group, another tag ID belonging to the group, and the like may be stored. The content type column 626 stores information indicating the type of contents described in the tag, specifically, "text", "handwritten character recognition result", "figure", "image", or the like. The content column 628 stores contents written in the tag. For example, the type of contents is text data in a case where the content type column 626 is "text" or "handwritten character recognition result", the type of contents is stroke data in a case where the content type column 626 is "figure", and the type of contents is image data (image data obtained by an electronic camera or the like) in a case where the content type column 626 is "image". The handwritten original data column 630 stores handwritten original data in a case where the content type column 626 is "handwritten character recognition result". In a case where a tag is displayed, text data which is a handwritten character recognition result may be displayed, or handwritten character itself may be displayed. The creation-case sound recognition result data column 632 stores sound recognition result data in a case where the tag is created. The starting date and time column 634 stores a date and time when the recording of a sound in the creation-case sound recognition result data column 632 is started. The termination date and time column 636 stores a date and time when the recording of a sound in the creation-case sound recognition result data column 632 is terminated. The explanation-case sound recognition result data column 638 stores sound recognition result data when the tag is explained. The starting date and time column 640 stores a date and time when the recording of a sound in the explanation-case sound recognition result data column 638 is started. The termination date and time column 642 stores a date and time when the recording of a sound in the explanation-case sound recognition result data column 638 is terminated.

The tag operation detection module 155 is connected to the sound information reception module 125 of the tag information reception module 110. The tag operation detection module 155 detects that an operation with respect to a tag has been performed on the shared screen terminal 200 or the electronic tag terminal 250. For example, an operation of selecting a tag, an operation of displaying a tag in an enlarged manner (an operation for explaining the tag), and the like may be detected.

FIG. 2 is a diagram illustrating a configuration example of a tag system using this exemplary embodiment.

The shared screen terminal 200 (a shared screen terminal 200A and a shared screen terminal 200B) includes the tag generation apparatus 100 (a tag generation apparatus 100X and a tag generation apparatus 100Y), and is connected to the microphone 205 (a microphone 205A and a microphone 205B).

The electronic tag terminal 250 (an electronic tag terminal 250A to an electronic tag terminal 250E) includes the tag generation apparatus 100 (a tag generation apparatus 100A to a tag generation apparatus 100E), and is connected to the microphone 255 (a microphone 255A to a microphone 255E).

The microphone 205 and the microphone 255 may be respectively embedded in the shared screen terminal 200 and the electronic tag terminal 250.

The shared screen terminal 200 generally includes a large-screen display apparatus, and is operated by a facilitator. The display apparatus can be viewed by all participants. Each electronic tag terminal 250 is operated by a participant at the assembly, and each participant generally owns one electronic tag terminal. For example, a tablet-type terminal or the like is used as the electronic tag terminal 250.

In the example of FIG. 2, the shared screen terminal 200A, the electronic tag terminal 250A, the electronic tag terminal 250B, and the electronic tag terminal 250C are installed in a conference room 280A, and assembly is performed. The shared screen terminal 200A, the electronic tag terminal 250A, the electronic tag terminal 250B, and the electronic tag terminal 250C are connected to each other through a communication line 298. The communication line 298 may be a wireless line, a wired line, or a combination thereof, and may be, for example, the Internet, an intranet, or the like as communication infrastructure.

In addition, a shared screen terminal 200B, an electronic tag terminal 250D, and an electronic tag terminal 250E are installed in a conference room 280B, and assembly is performed. The shared screen terminal 200B, the electronic tag terminal 250D, and the electronic tag terminal 250E are connected to each other through the communication line 298.

A mount and/or tag information storage apparatus 294, devices in the conference room 280A, and devices in the conference room 280B are connected to each other through a communication line 299. In addition, a function of the mount and/or tag information storage apparatus 294 may be realized as a loud service.

The mount and/or tag information storage apparatus 294 stores information on a tag. Each shared screen terminal 200 performs processing by using the mount and/or tag information storage apparatus 294. In this case, the information on the tag which is stored in the mount and/or tag information storage apparatus 294 may be shared by the plural shared screen terminals 200. That is, information on a mount and a tag which is managed by the shared screen terminal 200A may be used by the shared screen terminal 200B. Particularly, in a case where plural assemblies (for example, assemblies in the conference room 280A and the conference room 280B) relate to one project, a tag corresponding to the same task may be attached to a mount in another assembly. Accordingly, at one assembly, it is possible to ascertain conditions of the same task at another assembly.

For example, a participant generates a tag by using the electronic tag terminal 250. In this case, a handwritten character is described in the tag. In the handwriting, a figure is easily drawn, and variations, such as the change of the size of character, can be made to a sentence, as compared to a case where a keyboard or the like is used. That is, it is easy to reflect a creator's intention and to increase the amount of information in one tag.

However, there are restrictions, such as the inability to receive and transmit information to the next process or the inability to retrieve information, in the state of a handwritten character. Consequently, the character recognition of the handwritten character is performed.

Examples of a character recognition technique for the handwritten character include (1) the recognition of the shape of a character and (2) the recognition of stroke data. However, the accuracy of character recognition is not perfect, and the degree of accuracy is particularly reduced in a case where a figure is mixed.

On the other hand, interpretation may be performed for other participants while performing handwriting on a tag. Thereafter, the tag may be interpreted. Therefore, in this exemplary embodiment, a recognition result of a handwritten character is corrected by recognizing a sound by the interpretation, explanation, or the like, so that the accuracy of the recognition result of the handwritten character is improved.

Figure 3B:
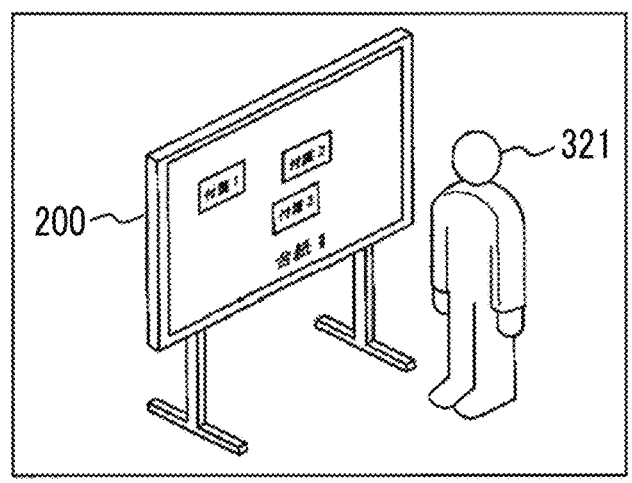
Figure 3C:
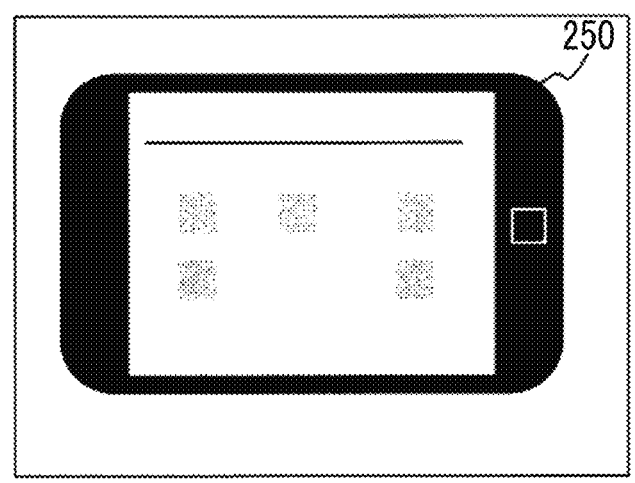

FIGS. 3A to 3C are diagrams respectively illustrating usage examples of the electronic tag terminal 250 and the shared screen terminal 200 in a conference room or the like used in this exemplary embodiment.

As illustrated in the example of FIG. 3A, participants 311 and 312 and a facilitator 321 are gathered in a conference room or the like. The participant 311 uses the electronic tag terminal 250A, and the participant 312 uses the electronic tag terminal 250B. In general, one terminal apparatus (electronic tag terminal 250A or the like) is given to one participant, and the terminal apparatus is a tablet-type terminal which is as large as a notebook (for example, A4, B5, 7 inches to 10 inches, or the like) like the electronic tag terminal 250 illustrated in the example of FIG. 3C, and is operated using a finger, a pen, or the like. Tag information including text data, a handwritten character, a figure, or the like is created by the participant. Meanwhile, the terminal apparatus is not limited to the tablet-type terminal, and may be a PC (a notebook PC is included) which includes a keyboard, a mouse, and the like.

A shared screen terminal 200x illustrated in the example of FIG. 3A is a projector, and displays a mount and a tag. In addition, a shared screen terminal 200y is an electronic white board, and detects the motion of the finger, a pen, or the like of the facilitator 321 to receive an operation such as the attachment of a child mount or a tag to a mount (table), the movement of the child mount or the tag, and the association of the child mount or the tag (grouping). For example, the shared screen terminal 200y is provided with a pen, and thus operations for the mount, the child mount, and the tag are received by detecting the separation of the pen from a predetermined pen holder (lifting-up of the pen in order for the facilitator 321 to operate the pen) and detecting the position of the tip of the pen (the touch of the pen tip on the shared screen terminal 200y, or the like). For example, a sensor (a sensor which is turned on by the gravity of the pen, or the like) is provided in the pen holder, and it may be detected which one of plural pens (a black pen, a red pen, a blue pen, and the like) is used. In addition, the entire screen of the shared screen terminal 200y is a touch sensor, and a touched position of the display screen and pressure may be detected. In this example, the turn-on and turn-off of the pen are controlled by the pen holder, but the pen holder does not necessarily need to be provided. The turn-on and turn-off of the pen may be controlled on the pen side. Regarding the change of color, the color may be changed by preparing a color palette at a portion on the display screen and touching a target color by a pen (or something similar to a pen) without requiring a pen holder, or a pen may be equipped with a function (a button, a slider, or the like) for giving an instruction for changing color.

In addition, the shared screen terminal 200 may be an electronic board as illustrated in the example of FIG. 3B. The electronic board generally includes a large-screen display apparatus (larger than at least the display apparatus of the electronic tag terminal 250), and the display apparatus is a touch panel and detects a touched position of the display screen and pressure. For example, the screen may be a screen having a size of 80 inches, or the like.

FIG. 7 is a flowchart illustrating a processing example according to this exemplary embodiment.

Figure 8A:
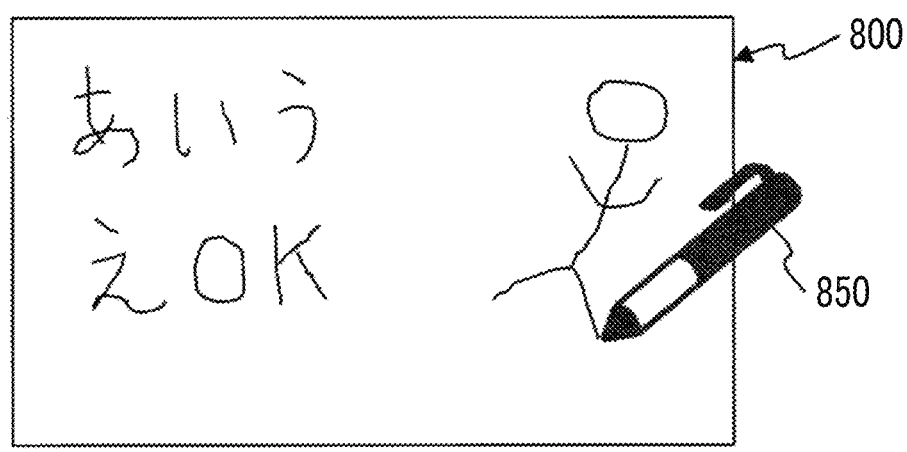
FIGS. 8A and 8B are diagrams illustrating a processing example according to this exemplary embodiment.

In step S702, the tag generation start detection module 105 detects the start of generation of a tag. For example, the tag generation start detection module detects the pressing-down of a tag generation starting button. As illustrated in an example of FIG. 8A, a user performs handwriting by using a pen 850 on a tag writing screen 800. For example, a character and a figure are written by a hand. When the handwriting is performed, the user utters a sound. The sound may be a sound for explanation (a case where a tag is created while giving an explanation), or a soliloquy sound. Processes of steps S704 and S706 and processes of steps S708 and S710 are performed in parallel.

In step S704, the handwritten information reception module 120 receives handwritten information.

In step S706, the character recognition module 130 performs character recognition.

In step S708, the sound information reception module 125 receives sound information.

In step S710, the sound recognition module 135 performs sound recognition.

In step S712, the association module 140 associates a character recognition result and a sound recognition result with each other. A description will be given using an example of FIG. 9. FIG. 9 illustrates a process of generating a tag.

A handwritten character 910 is generated while a user utters a sound 950.

Writing start 914 is positioned after tag creation start 912, the handwritten character 910 is generated, writing termination 916 is positioned, and a tag is generated at tag creation termination 920. A handwritten information acquisition period 918 ranges from the writing start 914 to the writing termination 916. An association sound information acquisition period 952 ranges from the tag creation start 912 to the tag creation termination 920. The association sound information acquisition period 952 may include at least the handwritten information acquisition period 918.

Date and time information may be added to each of a recognition result of the handwritten character 910 and a recognition result of the sound 950 (the starting date and time column 410 and the termination date and time column 415 of the handwritten recognition result table 400, the starting date and time column 510 and the termination date and time column 515 of the sound recognition result table 500), and thus the recognition results of the handwritten character 910 and the sound 950 are associated with each other so that the pieces of date and time information thereof are consistent with each other. Meanwhile, as the "consistent" as mentioned herein, the association may be performed exactly using the date and time information. However, in general, a point in time when the handwritten character 910 is written and a point in time when the sound 950 may deviate from each other, and thus the recognition result of the sound 950 within a period in a predetermined range may be associated with a date and time of the recognition result of the handwritten character 910.

In step S714, the character recognition result correction module 145 corrects the character recognition result by using the sound recognition result. For example, "0 (numerical number)" and "O (alphabetic character)" as the character recognition result are hardly distinguishable from each other. That is, the degree of certainty is reduced, or a difference between both the degrees of certainty is reduced. However, it is pronounced "OK" as a sound, and thus the sound of "O (alphabetic character)" is recognized. The character recognition result is fixed as "O (alphabetic character)" by using the sound recognition result. Specifically, correction processing as illustrated in an example of FIG. 13 or FIG. 14 to be described later is performed.

In step S716, the tag generation module 150 applies the sound recognition result as meta information. Here, the "application of meta information" specifically refers to the storage of the sound recognition result in the creation-case sound recognition result data column 632 of the tag information table 600 illustrated in the example of FIG. 6.

In step S718, the tag generation module 150 generates a tag.

Figure 8B:
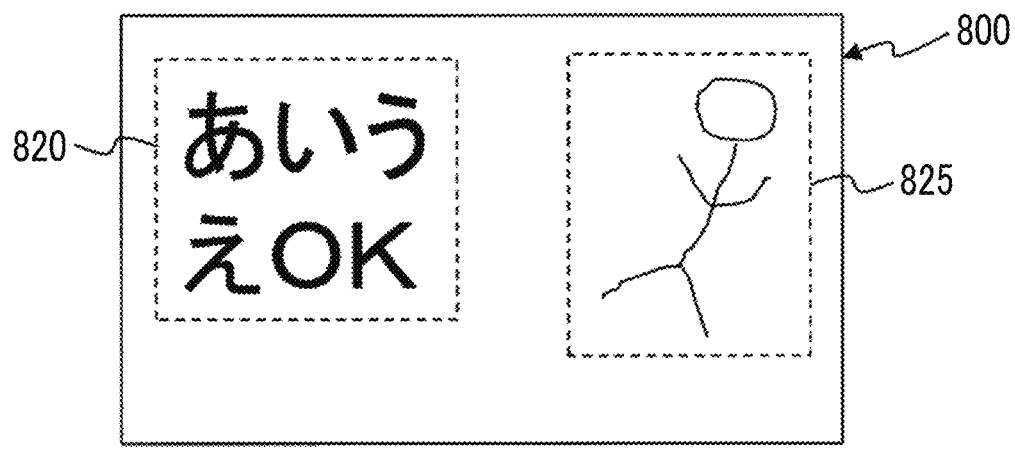

A display example of the tag writing screen 800 after this processing is terminated is as illustrated FIG. 8B. That is, the processing result in step S714 is displayed in a character recognition presentation region 820.

The character recognition presentation region 820 and a figure presentation region 825 are displayed on the tag writing screen 800. Here, "あいうえ OK" which is the processing result in step S714 is displayed in the character recognition presentation region 820, and a figure which is irrecognizable as a character is displayed in the figure presentation region 825. Specifically, the figure is stroke data of which the degree of certainty of character recognition is lower than a predetermined threshold value, and is stroke data in a case where correction cannot be performed even in a case where a sound recognition result is used. Meanwhile, a character recognition result is displayed at the same position of handwriting.

FIG. 10 is a flowchart illustrating a processing example according to this exemplary embodiment.

In step S1002, the tag operation detection module 155 detects an operation with respect to a tag. For example, a tag selection operation, an enlargement display operation, and the like are detected.

In step S1004, the sound information reception module 125 receives sound information.

In step S1006, the sound recognition module 135 performs sound recognition.

Figure 11:
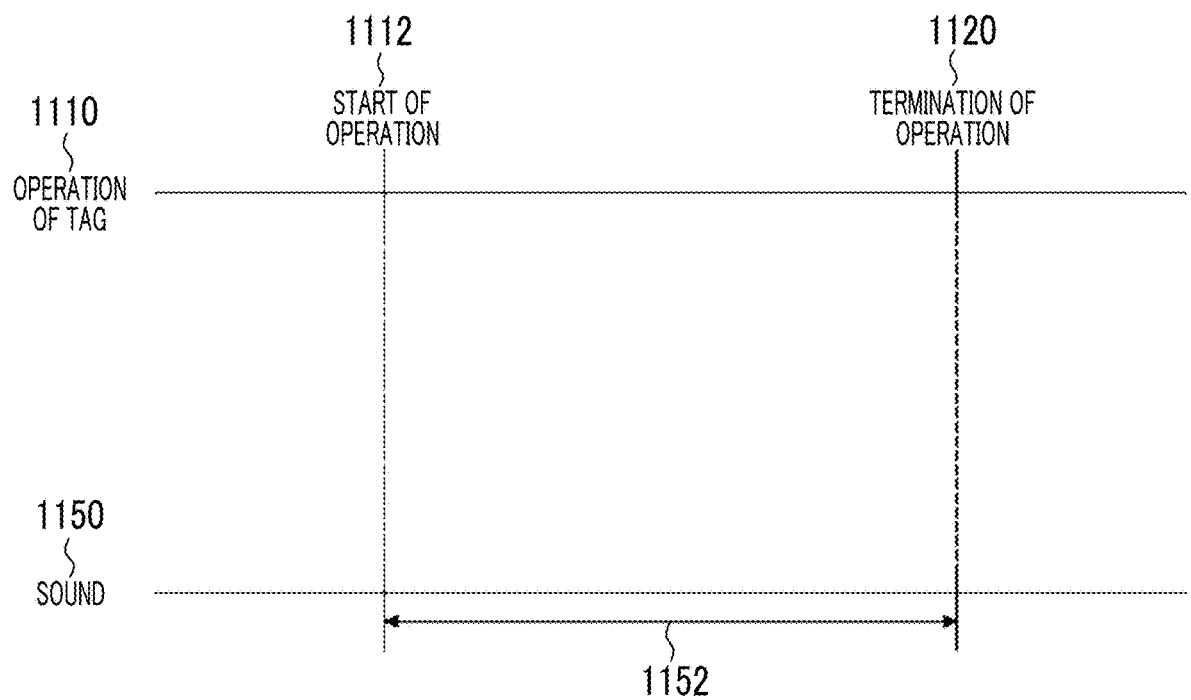
FIG. 11 is a diagram illustrating a processing example according to this exemplary embodiment.

In step S1008, the association module 140 associates a character recognition result and a sound recognition result with each other. Meanwhile, the association as mentioned herein means that handwriting does not occur, and thus a character recognition result and a sound recognition result (a sound recognition result in step S1006) in a target tag are merely associated with each other. However, a character in a tag is often readout as it is, and thus the order in a character recognition result and the order in a sound recognition result are associated with each other. An example of FIG. 11 shows a process in a case where a tag is explained.

As a tag operation 1110, operation termination 1120 is positioned after operation start 1112. Consequently, a period of a target sound 1150 is an association sound information acquisition period 1152 ranging from the operation start 1112 to the operation termination 1120.

In step S1010, the character recognition result correction module 145 corrects the character recognition result by using the sound recognition result. For example, correction processing as illustrated in an example of FIG. 14 to be described later is performed.

In step S1012, the tag generation module 150 applies the sound recognition result as meta information.

In step S1014, the tag generation module 150 corrects a tag.

Figure 12:
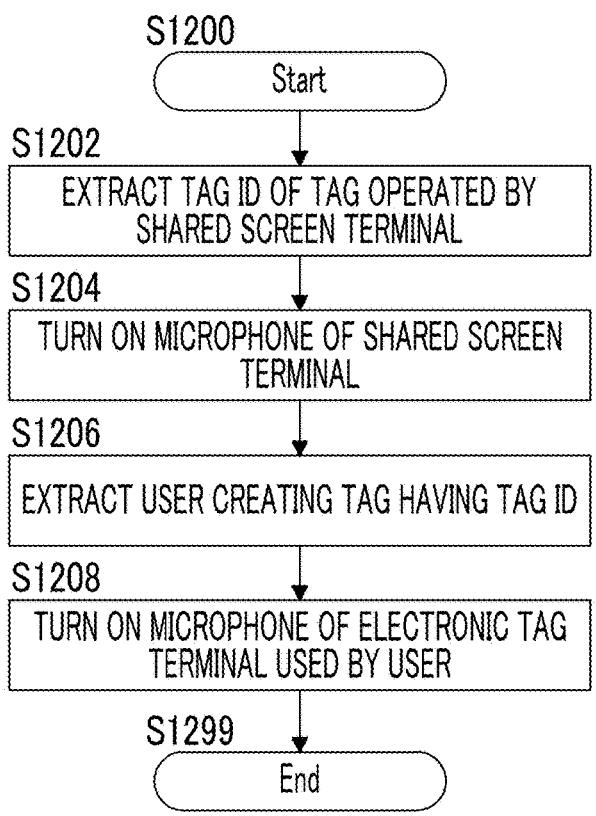
FIG. 12 is a flowchart illustrating a processing example according to this exemplary embodiment.

FIG. 12 is a flowchart illustrating a processing example according to this exemplary embodiment. The drawing illustrates a control processing example of a microphone that acquires a sound in the processing (processing using a sound generated during the explanation of a tag) which is illustrated in the example of FIG. 10.

In step S1202, a tag ID of a tag operated by the shared screen terminal 200 is extracted.

In step S1204, the microphone 205 of the shared screen terminal 200 is turned on. In other words, this is to cause a facilitator of the shared screen terminal 200 to cope with a case where the tag is explained.

In step S1206, a user who creates the tag having the tag ID is extracted.

In step S1208, the microphone 255 of the electronic tag terminal 250 used by the user is turned on. In other words, this is to cause the creator of the tag to cope with a case where the tag is explained.

At an assembly in which the creator of the tag is supposed to perform explanation, the process of step S1204 may be omitted. At an assembly in which the facilitator is supposed to perform explanation, the processes of steps S1206 and S1208 may be omitted. At the beginning of the assembly, a rule regarding who will explain a tag may be set, and the processing (the process of step S1204 is omitted, or the processes of steps S1206 and S1208 are omitted) which is illustrated in the example of FIG. 12 may be performed in accordance with the setting.

Figure 13:
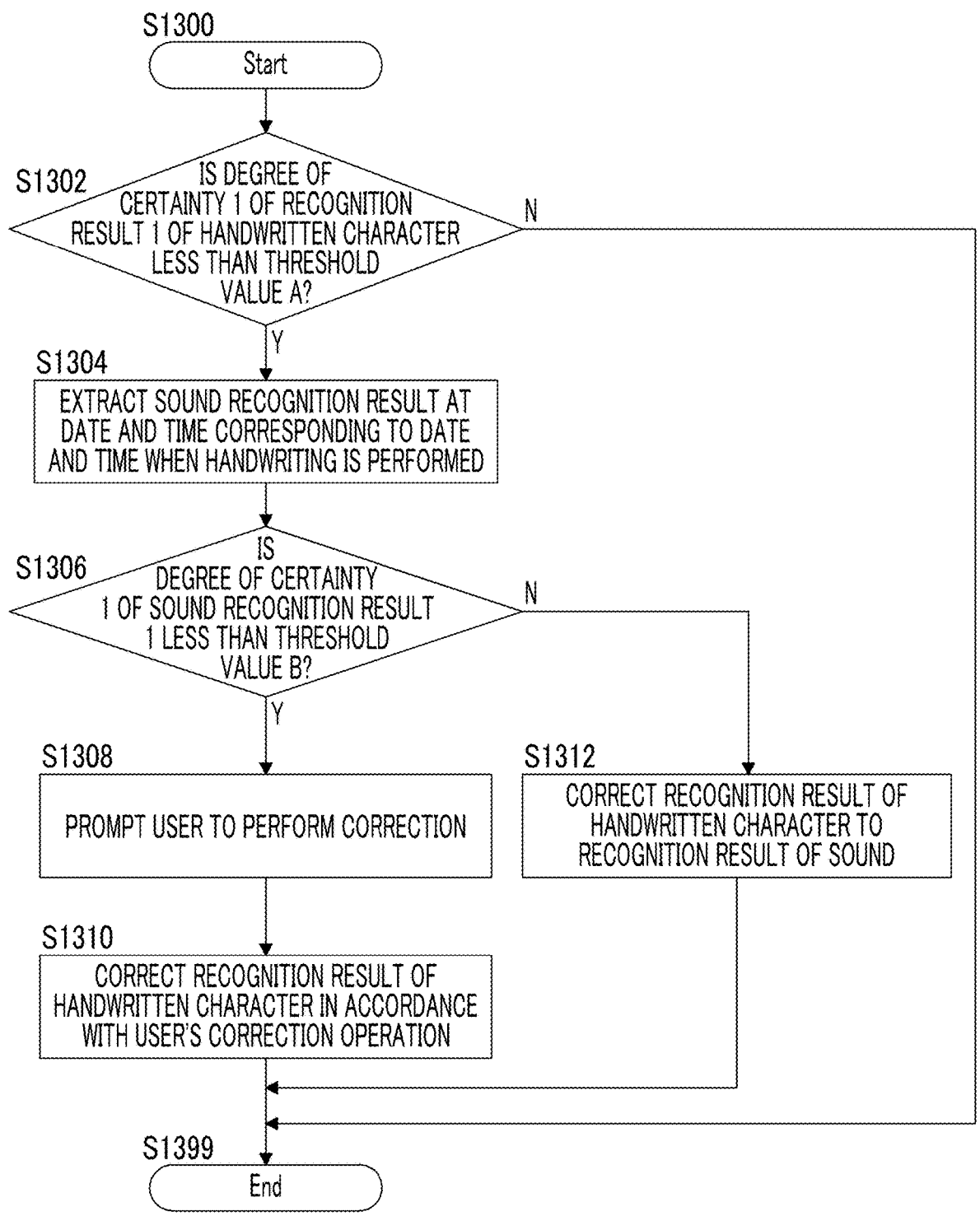
FIG. 13 is a flowchart illustrating a processing example according to this exemplary embodiment.

FIG. 13 is a flowchart illustrating a processing example according to this exemplary embodiment. The drawing illustrates a processing example in which a character recognition result is corrected using a sound recognition result. The processing illustrated in the example of FIG. 7 is performed.

In step S1302, it is determined whether "a degree of certainty 1 of a recognition result 1 of a handwritten character is less than a threshold value A". The processing proceeds to step S1304 in a case where "the degree of certainty 1 of the recognition result 1 of the handwritten character is less than the threshold value A", the processing is terminated in other cases (step S1399). Meanwhile, the processing may proceed to step S1308 in a case where a difference between the degree of certainty 1 and a degree of certainty 2 is less than a predetermined value, and the processing may proceed to step S1312 in other cases.

In step S1304, a sound recognition result at a date and time corresponding to a date and time when handwriting is performed is extracted.

In step S1306, it is determined whether "the degree of certainty 1 of the sound recognition result 1 is less than a threshold value B". The processing proceeds to step S1308 in a case where "the degree of certainty 1 of the sound recognition result 1 is less than the threshold value B", and the processing proceeds to step S1312 in other cases. Meanwhile, the threshold value A and the threshold value B may be the same value or may be different values.

In step S1308, a user is prompted to perform correction. In other words, this is because there is a high probability that both the character recognition result and the sound recognition result are the incorrect answer. Meanwhile, the character recognition result or the sound recognition result may be displayed so as to be selectable as a correction candidate.

In step S1310, the recognition result of the handwritten character is corrected in accordance with the user's correction operation.

In step S1312, the recognition result of the handwritten character is corrected to the recognition result of the sound. In other words, this is because the sound recognition result can be more reliable than the character recognition result.

Figure 14:
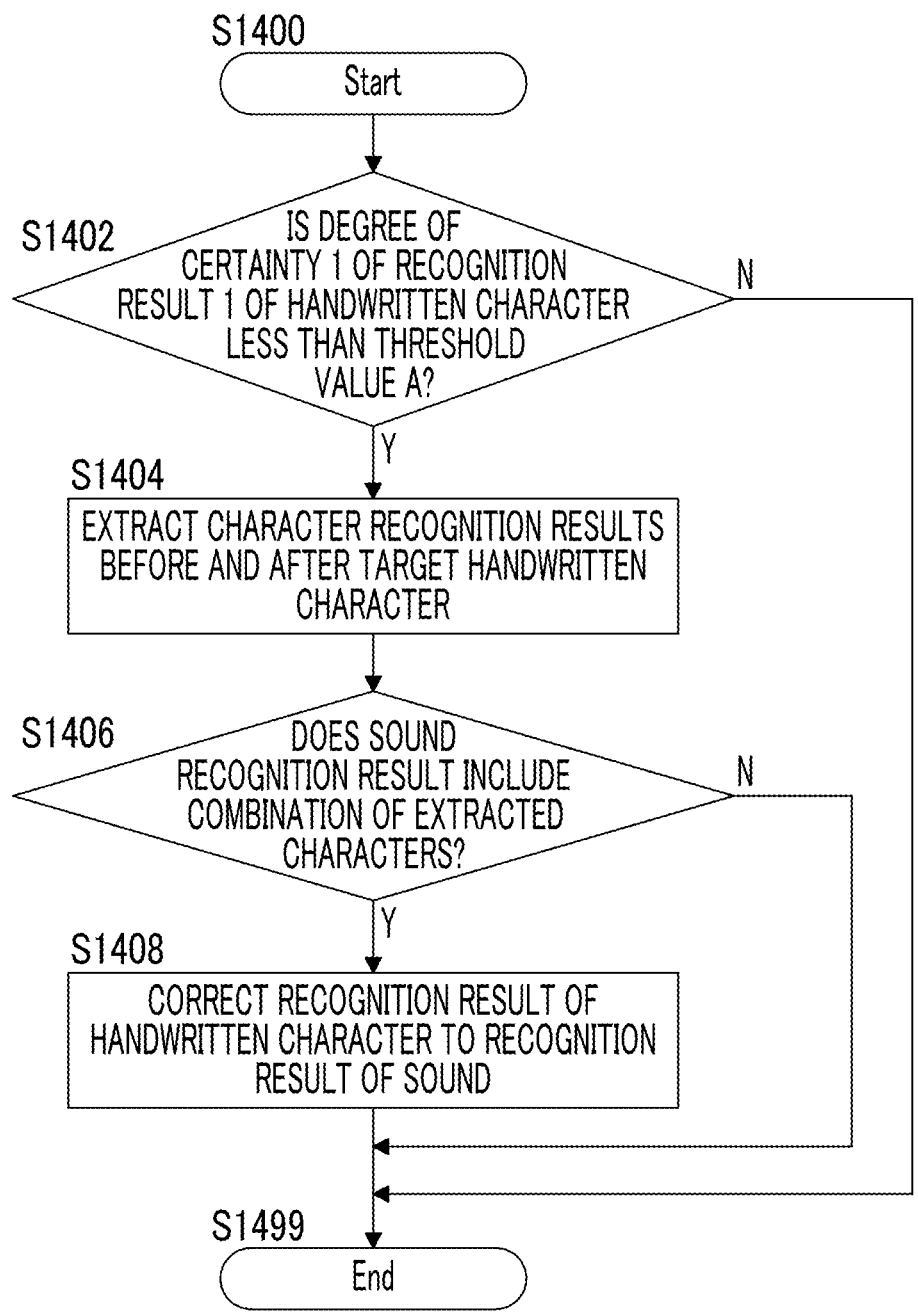
FIG. 14 is a flowchart illustrating a processing example according to this exemplary embodiment.

FIG. 14 is a flowchart illustrating a processing example according to this exemplary embodiment. The drawing illustrates a processing example in which a character recognition result is corrected using a sound recognition result. The processing illustrated in the examples of FIGS. 7 and 10 is performed.

In step S1402, it is determined whether "a degree of certainty 1 of a recognition result 1 of a handwritten character is less than a threshold value A". The processing proceeds to step S1404 in a case where "the degree of certainty 1 of the recognition result 1 of the handwritten character is less than the threshold value A", and the processing is terminated in other cases (step S1499).

In step S1404, character recognition results before and after a target handwritten character are extracted.

In step S1406, it is determined whether or not a sound recognition result includes a combination of extracted characters. The processing proceeds to step S1408 in a case where the sound recognition result includes a combination of extracted characters, and the processing is terminated in other cases (step S1499).

In step S1408, a recognition result of the handwritten character is corrected to a recognition result of a sound.

For example, in a case where a recognition result of the target handwritten character is "X" (the degree of certainty of "X" is less than the threshold value A), the previous character is "A", and the subsequent character is "B", it may be retrieved whether a character string ("A?B" in a case of written by a regular expression) of "A", "any one character", and "B" is included in the sound recognition result.

In a case where the character string is included in the sound recognition result, "X" which is the recognition result of the handwritten character is corrected to a character surrounded by "A" and "B" included in the sound recognition result, in step S1408.

Meanwhile, the previous and subsequent characters have been set to be one character, but may be plural characters. In addition, a character to be corrected has been set to be one character, but may be plural characters. In addition, the correction may be performed by performing grammar processing such as morpheme analysis.

Figure 15:
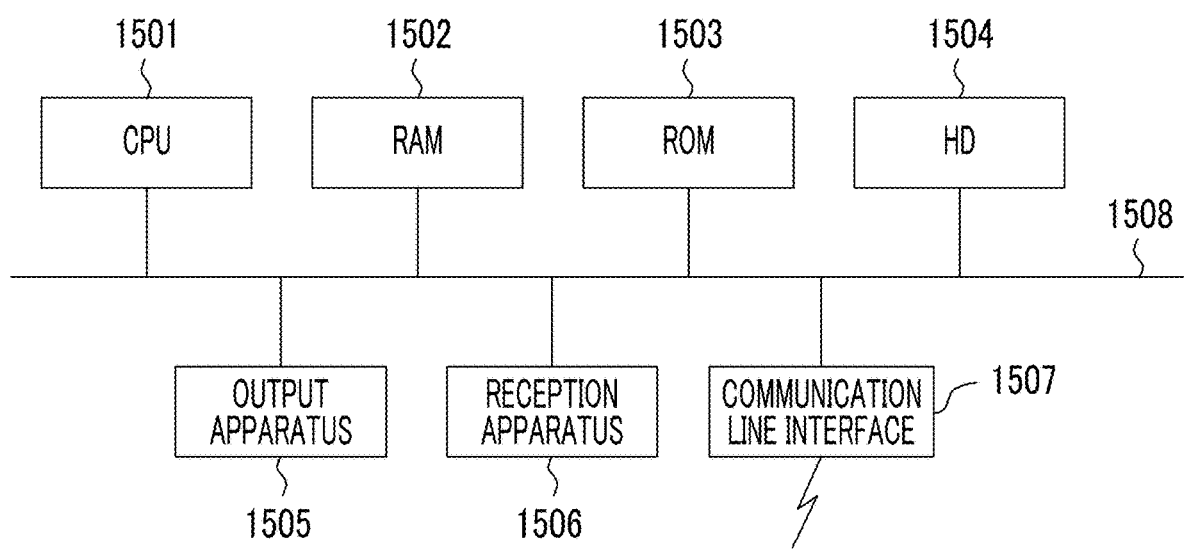
FIG. 15 is a block diagram illustrating a hardware configuration example of a computer for realizing this exemplary embodiment.

Meanwhile, a hardware configuration of a computer executing a program as this exemplary embodiment is a general computer as illustrated in FIG. 15, and specifically, is a personal computer, a computer that may serve as a server, or the like. That is, as a specific example, a CPU 1501 is used as a processing unit (computational unit), and a RAM 1502, a ROM 1503, and an HD 1504 are used as storage devices. As the HD 1504, for example, a hard disk or a Solid State Drive (SSD) may be used. The computer includes the CPU 1501 that executes programs such as the tag generation start detection module 105, the tag information reception module 110, the character recognition module 130, the sound recognition module 135, the association module 140, the character recognition result correction module 145, the tag generation module 150, and the tag operation detection module 155, the RAM 1502 that stores the programs and data, the ROM 1503 that stores programs for starting up the computer, and the like, the HD 1504 which is an auxiliary storage device (may be a flash memory or the like) which stores the recognition result obtained by the character recognition module 130, the recognition result obtained by the sound recognition module 135, the handwritten recognition result table 400, the sound recognition result table 500, the tag information table 600, and the like, a reception apparatus 1506 that receives data on the basis of a user's operation (including a motion, a sound, an eye gaze, and the like) with respect to a keyboard, a mouse, a touch screen, a microphone, a camera (including an eye gaze detection camera, and the like), and the like, an output apparatus 1505 such as a CRT, a liquid crystal display, or a speaker, a communication line interface 1507, such as a network interface card, for connection to a communication network, and a bus 1508 for transmitting and receiving data by connecting the above-mentioned components. Plural computers may be connected to each other through a network.

Regarding the exemplary embodiment based on a computer program among the above-described exemplary embodiments, a system having this hardware configuration is caused to read a computer program which is software, and the above-described exemplary embodiment is realized by the cooperation of software and hardware resources.

Meanwhile, a hardware configuration illustrated in FIG. 15 shows one configuration example. This exemplary embodiment is not limited to the configuration illustrated in FIG. 15, and the information processing apparatus may be configured such that the modules described in this exemplary embodiment are capable of being executed. For example, some modules may be constituted by dedicated hardware (for example, an Application Specific Integrated Circuit (ASIC) or the like), some modules may be configured to be provided in an external system and connected to each other through a communication line, or plural systems each of which is illustrated in FIG. 15 may be connected to each other through a communication line and operated in cooperation with each other. In addition, the information processing apparatus may be particularly incorporated into portable information communication equipment (including a mobile phone, a smart phone, a mobile equipment, a wearable computer, and the like), an information appliance, a robot, a copying machine, a facsimile, a scanner, a printer, a multifunction machine (an image processing apparatus including any two or more of a scanner, a printer, a copying machine, and a facsimile), and the like, in addition to a personal computer.

In addition, in comparison processing in the description of the above-described exemplary embodiment, "equal to or greater than", "equal to or less than", "greater than", and "smaller (less) than" may be respectively set to be "greater than", "smaller (less) than", "equal to or greater than", and "equal to or less than", as long as inconsistency does not occur in the combinations thereof.

Meanwhile, the programs described above may be provided through a recording medium which stores the programs, or may be provided through a communication unit. In these cases, for example, the programs described above may be interpreted as an invention of "a computer-readable recording medium that stores programs".

The "computer-readable recording medium that stores programs" refers to a computer-readable recording medium that stores programs and is used for the installation and execution of the programs and the distribution of the programs.

Meanwhile, examples of the recording medium include a digital versatile disk (DVD) having a format of "DVD-R, DVD-RW, DVD-RAM, or the like" which is a standard developed by the DVD forum or having a format of "DVD+R, DVD+RW, or the like" which is a standard developed by the DVD+RW alliance, a compact disk (CD) having a format of CD read only memory (CD-ROM), CD recordable (CD-R), CD rewritable (CD-RW), or the like, a Blu-ray Disc (registered trademark), a magneto-optical disk (MO), a flexible disk (FD), a magnetic tape, a hard disk, a read only memory (ROM), an electrically erasable programmable ROM (EEPROM (registered trademark)), a flash memory, a random access memory (RAM), a secure digital (SD) memory card, and the like.

The above-described programs or some of them may be stored and distributed by recording on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. The programs may be carried on carrier waves.

Further, the above-described programs may be a portion or all of other programs, or may be recorded on a recording medium along with other programs. The programs may be recorded on plural recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a character recognition unit that recognizes a handwritten character in creating a tag which is attachable to a mount;
a sound recognition unit that recognizes a sound; and
a correction unit that corrects a recognition result obtained by the character recognition unit by using a recognition result of the sound recognition unit,
wherein the sound recognition unit recognizes a sound related to the tag,
wherein the sound recognition unit sets a sound generated during the handwriting of a target character of the character recognition unit with respect to the tag, as an object to be recognized,
wherein the sound recognition unit sets a sound of an operator creating the tag, as an object to be recognized.

2. The information processing apparatus according to claim 1,
wherein the sound recognition unit sets a sound generated during the operation of the tag, as an object to be recognized.

3. The information processing apparatus according to claim 2,
wherein the sound recognition unit sets a sound generated during the operation of the tag by a facilitator or a creator of the tag, as an object to be recognized.

4. The information processing apparatus according to claim 1, further comprising:
an addition unit that adds the recognition result of the sound recognition unit as meta information of the tag.

5. The information processing apparatus according to claim 4,
wherein the addition unit adds a figure handwritten on the tag, as the meta information.

6. The information processing apparatus according to claim 5,
wherein the addition unit sets a handwritten portion which is irrecognizable by the character recognition unit, to be the figure.

7. A non-transitory computer readable medium storing an information processing program causing a computer to function as:
a character recognition unit that recognizes a handwritten character in creating a tag which is attachable to a mount;
a sound recognition unit that recognizes a sound; and
a correction unit that corrects a recognition result obtained by the character recognition unit by using a recognition result of the sound recognition unit,
wherein the sound recognition unit recognizes a sound related to the tag, wherein the sound recognition unit sets a sound generated during the handwriting of a target character of the character recognition unit with respect to the tag, as an object to be recognized, wherein the sound recognition unit sets a sound of an operator creating the tag, as an object to be recognized.

8. An information processing apparatus comprising:

a character recognition means that recognizes a handwritten character in creating a tag which is attachable to a mount;

a sound recognition means that recognizes a sound; and a correction means that corrects a recognition result obtained by the character recognition means by using a recognition result of the sound recognition means, wherein the sound recognition means recognizes a sound related to the tag, wherein the sound recognition means sets a sound generated during the handwriting of a target character of the character recognition means with respect to the tag, as an object to be recognized, wherein the sound recognition means sets a sound of an operator creating the tag, as an object to be recognized.

* * * * *